United States Patent
Minikey, Jr. et al.

(10) Patent No.: US 9,994,156 B2
(45) Date of Patent: Jun. 12, 2018

(54) REARVIEW DEVICE

(71) Applicant: Gentex Corporation, Zeeland, MI (US)

(72) Inventors: Danny L. Minikey, Jr., Fenwick, MI (US); Mark R. Roth, Grand Rapids, MI (US); Nigel T. Lock, Holland, MI (US); Michael F. Lisowski, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 26 days.

(21) Appl. No.: 15/337,975

(22) Filed: Oct. 28, 2016

(65) Prior Publication Data

US 2017/0120826 A1 May 4, 2017

Related U.S. Application Data

(60) Provisional application No. 62/248,953, filed on Oct. 30, 2015.

(51) Int. Cl.
*B60R 1/02* (2006.01)
*B60R 1/04* (2006.01)
(Continued)

(52) U.S. Cl.
CPC ............ *B60R 1/088* (2013.01); *B60Q 1/2665* (2013.01); *B60Q 3/258* (2017.02); *B60R 1/02* (2013.01);
(Continued)

(58) Field of Classification Search
CPC .. B60R 1/02; B60R 1/025; B60R 1/04; B60R 1/06; B60R 1/086; B60R 1/088;
(Continued)

(56) References Cited

U.S. PATENT DOCUMENTS 2,131,888 A 10/1938 Harris
2,632,040 A 3/1953 Rabinow
(Continued)

FOREIGN PATENT DOCUMENTS

DE 102010064082 A1 6/2012
EP 0513476 11/1992
(Continued)

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.
(Continued)

*Primary Examiner* — Loha Ben
(74) *Attorney, Agent, or Firm* — Price Heneveld LLP; Bradley D. Johnson

(57) ABSTRACT

A rearview device includes a housing that includes a first side and a second side opposite the first side. An electro-optic element is operably coupled with the first side of the housing. A rear trim bezel is disposed on the second side of the housing. A rear trim plate is operably coupled with the second side of the housing. A peripheral gap is defined between the rear trim plate and the second side of the housing. A spacing truss is disposed in the peripheral gap. The spacing truss includes first and second lateral walls extending to the rear trim bezel.

20 Claims, 5 Drawing Sheets

(51) Int. Cl.
 *B60R 1/08* (2006.01)
 *G02F 1/15* (2006.01)
 *B60Q 1/26* (2006.01)
 *B60R 1/12* (2006.01)
 *G02F 1/153* (2006.01)
 *B60Q 3/258* (2017.01)
 *G02F 1/163* (2006.01)
 *G02F 1/157* (2006.01)

(52) U.S. Cl.
 CPC ............... *B60R 1/04* (2013.01); *B60R 1/12* (2013.01); *G02F 1/153* (2013.01); *G02F 1/163* (2013.01); *B60R 1/025* (2013.01); *G02F 1/157* (2013.01)

(58) Field of Classification Search
 CPC ..... B60R 1/12; B60R 1/1207; B60R 16/0207; B60R 2001/1215; B60R 2300/103; G02F 1/153; G02F 1/155; G02F 1/157; G02F 1/161; G02F 1/163; B60Q 1/2665; B60Q 3/258; B60C 23/00; B60C 23/0408; B60K 35/00; B60K 37/06
 USPC ............... 359/265, 267, 268, 270, 275, 632; 362/135, 140, 494, 503; 348/77, 78, 148; 340/425.5, 438, 815.4
 See application file for complete search history.

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,280,701 A | 10/1966 | Donnelly et al. |
| 3,581,276 A | 5/1971 | Newman |
| 3,663,819 A | 5/1972 | Hicks et al. |
| 3,837,129 A | 9/1974 | Losell |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| D283,998 S | 5/1986 | Tanaka |
| 4,599,544 A | 7/1986 | Martin |
| 4,630,904 A | 12/1986 | Pastore |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,902,108 A | 2/1990 | Byker |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,052,163 A | 10/1991 | Czekala |
| 5,066,112 A | 11/1991 | Lynam et al. |
| 5,069,535 A | 12/1991 | Baucke et al. |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,115,346 A | 5/1992 | Lynam |
| 5,121,200 A | 6/1992 | Choi et al. |
| 5,124,549 A | 6/1992 | Michaels et al. |
| 5,128,799 A | 7/1992 | Byker |
| 5,151,824 A | 9/1992 | O'Farrell |
| 5,158,638 A | 10/1992 | Osanami et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,253,109 A | 10/1993 | O'Farrell et al. |
| 5,278,693 A | 1/1994 | Theiste |
| 5,280,380 A | 1/1994 | Byker |
| 5,282,077 A | 1/1994 | Byker |
| 5,289,321 A | 2/1994 | Secor |
| 5,294,376 A | 3/1994 | Byker |
| 5,296,924 A | 3/1994 | Blancard et al. |
| D346,356 S | 4/1994 | Leu |
| 5,304,980 A | 4/1994 | Maekawa |
| 5,329,206 A | 7/1994 | Slotkowski et al. |
| 5,336,448 A | 8/1994 | Byker |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,379,146 A | 1/1995 | Defendini |
| 5,381,309 A | 1/1995 | Borchardt |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,421,940 A | 6/1995 | Cornils et al. |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,448,397 A | 9/1995 | Tonar |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |

(56) References Cited

U.S. PATENT DOCUMENTS

| | | |
|---|---|---|
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,649,756 A | 7/1997 | Adams et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,679,283 A | 10/1997 | Tonar |
| 5,680,123 A | 10/1997 | Lee |
| 5,682,267 A | 10/1997 | Tonar |
| 5,684,473 A | 11/1997 | Hibino et al. |
| 5,689,370 A | 11/1997 | Tonar |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,742,026 A | 4/1998 | Dickinson |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,790,298 A | 8/1998 | Tonar |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,803,579 A | 9/1998 | Turnbull |
| 5,808,778 A | 9/1998 | Bauer et al. |
| 5,811,888 A | 9/1998 | Hsieh |
| 5,812,321 A | 9/1998 | Schierbeek et al. |
| 5,818,625 A | 10/1998 | Forgette et al. |
| 5,825,527 A | 10/1998 | Forgette et al. |
| D400,481 S | 11/1998 | Stephens et al. |
| D401,200 S | 11/1998 | Huang |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,888,431 A | 3/1999 | Tonar et al. |
| 5,896,119 A | 4/1999 | Evanicky et al. |
| 5,904,729 A | 5/1999 | Ruzicka |
| 5,905,457 A | 5/1999 | Rashid |
| D410,607 S | 6/1999 | Carter |
| 5,912,534 A | 6/1999 | Benedict |
| 5,923,027 A | 7/1999 | Stam et al. |
| 5,923,457 A | 7/1999 | Byker et al. |
| 5,928,572 A | 7/1999 | Tonar et al. |
| 5,935,613 A | 8/1999 | Benham et al. |
| 5,940,011 A | 8/1999 | Agravante et al. |
| 5,940,201 A | 8/1999 | Ash et al. |
| 5,942,853 A | 8/1999 | Piscart |
| 5,949,331 A | 9/1999 | Schofield et al. |
| 5,956,012 A | 9/1999 | Turnbull et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel et al. |
| 5,998,617 A | 12/1999 | Srinivasa |
| 6,002,511 A | 12/1999 | Varaprasad |
| 6,008,486 A | 12/1999 | Stam et al. |
| 6,009,359 A | 12/1999 | El-Hakim et al. |
| 6,018,308 A | 1/2000 | Shirai |
| 6,020,987 A | 2/2000 | Baumann |
| 6,023,040 A | 2/2000 | Zahavi |
| 6,023,229 A | 2/2000 | Bugno et al. |
| 6,025,872 A | 2/2000 | Ozaki et al. |
| 6,037,471 A | 3/2000 | Srinivasa |
| 6,043,452 A | 3/2000 | Bestenlehrer |
| 6,046,766 A | 4/2000 | Sakata |
| 6,049,171 A | 4/2000 | Stam et al. |
| 6,051,956 A | 4/2000 | Nakashimo |
| 6,060,989 A | 5/2000 | Gehlot |
| 6,061,002 A | 5/2000 | Weber et al. |
| 6,062,920 A | 5/2000 | Jordan |
| 6,064,508 A | 5/2000 | Forgette et al. |
| 6,064,509 A | 5/2000 | Tonar et al. |
| 6,067,111 A | 5/2000 | Hahn et al. |
| 6,068,380 A | 5/2000 | Lynn et al. |
| 6,072,391 A | 6/2000 | Suzuki et al. |
| 6,078,355 A | 6/2000 | Zengel |
| 6,084,700 A | 7/2000 | Knapp |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,111,683 A | 8/2000 | Cammenga |
| 6,111,684 A | 8/2000 | Forgette |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,166,848 A | 12/2000 | Cammenga et al. |
| 6,167,755 B1 | 1/2001 | Damson et al. |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,181,242 B1 | 1/2001 | Nguyen |
| 6,184,781 B1 | 2/2001 | Ramakesavan |
| 6,185,492 B1 | 2/2001 | Kagawa et al. |
| 6,188,505 B1 | 2/2001 | Lomprey |
| 6,191,704 B1 | 2/2001 | Takenaga et al. |
| 6,193,378 B1 | 2/2001 | Tonar et al. |
| 6,193,912 B1 | 2/2001 | Theiste |
| 6,195,194 B1 | 2/2001 | Roberts et al. |
| 6,200,010 B1 | 3/2001 | Anders |
| 6,218,934 B1 | 4/2001 | Regan |
| 6,222,177 B1 | 4/2001 | Bechtel |
| 6,222,447 B1 | 4/2001 | Schofield et al. |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | Devries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,214 B1 | 6/2001 | Kashiwazaki |
| 6,249,369 B1 | 6/2001 | Theiste et al. |
| 6,250,766 B1 | 6/2001 | Strumolo et al. |
| 6,255,639 B1 | 7/2001 | Stam et al. |
| 6,259,475 B1 | 7/2001 | Ramachandran et al. |
| 6,262,831 B1 | 7/2001 | Bauer |
| 6,262,832 B1 | 7/2001 | Lomprey |
| 6,265,968 B1 | 7/2001 | Betzitza et al. |
| 6,268,803 B1 | 7/2001 | Gunderson et al. |

(56) References Cited

U.S. PATENT DOCUMENTS

| | | |
|---|---|---|
| 6,268,950 B1 | 7/2001 | Ash |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,291,812 B1 | 9/2001 | Bechtel |
| 6,300,879 B1 | 10/2001 | Regan et al. |
| 6,304,173 B2 | 10/2001 | Pala et al. |
| 6,313,457 B1 | 11/2001 | Bauer |
| 6,313,892 B2 | 11/2001 | Gleckman |
| 6,317,057 B1 | 11/2001 | Lee |
| 6,317,248 B1 | 11/2001 | Agrawal et al. |
| 6,320,612 B1 | 11/2001 | Young |
| 6,324,295 B1 | 11/2001 | Avionique et al. |
| D451,869 S | 12/2001 | Knapp et al. |
| 6,329,925 B1 | 12/2001 | Skiver et al. |
| 6,330,511 B2 | 12/2001 | Ogura et al. |
| 6,335,548 B1 | 1/2002 | Roberts |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,359,274 B1 | 3/2002 | Nixon |
| 6,363,326 B1 | 3/2002 | Scully |
| 6,369,701 B1 | 4/2002 | Yoshida et al. |
| 6,379,013 B1 | 4/2002 | Bechtel et al. |
| 6,392,783 B1 | 5/2002 | Lomprey |
| 6,396,040 B1 | 5/2002 | Hill |
| 6,396,397 B1 | 5/2002 | Bos et al. |
| 6,402,328 B1 | 6/2002 | Bechtel |
| 6,403,942 B1 | 6/2002 | Stam |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,412,959 B1 | 7/2002 | Tseng |
| 6,415,230 B1 | 7/2002 | Maruko et al. |
| 6,420,800 B1 | 7/2002 | Levesque |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,485 B1 | 7/2002 | Buljajewski |
| 6,428,172 B1 | 8/2002 | Hutzel et al. |
| 6,429,594 B1 | 8/2002 | Stam |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,441,943 B1 | 8/2002 | Roberts |
| 6,442,465 B2 | 8/2002 | Breed et al. |
| 6,443,585 B1 | 9/2002 | Saccomanno |
| 6,443,602 B1 | 9/2002 | Tanabe et al. |
| 6,447,128 B1 | 9/2002 | Lang et al. |
| 6,447,130 B2 | 9/2002 | Chu |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,465,963 B1 | 10/2002 | Turnbull |
| 6,466,701 B1 | 10/2002 | Ejiri et al. |
| 6,469,739 B1 | 10/2002 | Bechtel et al. |
| 6,471,362 B1 | 10/2002 | Carter |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | DeLine et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,504,142 B2 | 1/2003 | Nixon |
| 6,507,779 B2 | 1/2003 | Breed et al. |
| 6,512,624 B2 | 1/2003 | Tonar |
| 6,515,581 B1 | 2/2003 | Ho |
| 6,515,597 B1 | 2/2003 | Wada et al. |
| 6,520,667 B1 | 2/2003 | Mousseau |
| 6,521,916 B2 | 2/2003 | Roberts |
| 6,522,969 B2 | 2/2003 | Kannonji |
| 6,523,976 B1 | 2/2003 | Turnbull |
| D471,847 S | 3/2003 | Rumsey et al. |
| 6,535,126 B2 | 3/2003 | Lin et al. |
| 6,542,085 B1 | 4/2003 | Yang |
| 6,542,182 B1 | 4/2003 | Chutorash |
| 6,545,598 B1 | 4/2003 | De Villeroche |
| 6,545,794 B2 | 4/2003 | Ash |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,514,583 B1 | 7/2003 | Ogura et al. |
| 6,575,643 B2 | 7/2003 | Takashashi |
| 6,587,573 B1 | 7/2003 | Stam et al. |
| 6,591,192 B2 | 7/2003 | Okamura et al. |
| 6,594,614 B2 | 7/2003 | Studt et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,612,708 B2 | 9/2003 | Chu |
| 6,614,387 B1 | 9/2003 | Deadman |
| 6,614,579 B2 | 9/2003 | Roberts et al. |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,635,194 B2 | 10/2003 | Kloeppner |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,700,692 B2 | 3/2004 | Tonar |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,746,122 B2 | 6/2004 | Knox |
| D493,131 S | 7/2004 | Lawlor et al. |
| D493,394 S | 7/2004 | Lawlor et al. |
| 6,768,566 B2 | 7/2004 | Walker |
| 6,772,057 B2 | 8/2004 | Breed et al. |
| 6,774,988 B2 | 8/2004 | Stam et al. |
| 6,781,738 B2 | 8/2004 | Kikuchi et al. |
| 6,816,145 B1 | 11/2004 | Evanicky |
| 6,816,297 B1 | 11/2004 | Tonar |

(56) References Cited

U.S. PATENT DOCUMENTS

| | | | |
|---|---|---|---|
| D499,678 S | 12/2004 | Bradley | |
| 6,846,098 B2 | 1/2005 | Bourdelais et al. | |
| 6,847,487 B2 | 1/2005 | Burgner | |
| 6,853,413 B2 | 2/2005 | Larson | |
| 6,861,809 B2 | 3/2005 | Stam | |
| 6,870,656 B2 | 3/2005 | Tonar et al. | |
| 6,902,284 B2 | 6/2005 | Hutzel et al. | |
| 6,902,307 B2 | 6/2005 | Strazzanti | |
| 6,912,001 B2 | 6/2005 | Okamoto et al. | |
| 6,913,375 B2 | 7/2005 | Strazzanti | |
| 6,923,080 B1 | 8/2005 | Dobler et al. | |
| 6,930,737 B2 | 8/2005 | Weindorf et al. | |
| 6,934,080 B2 | 8/2005 | Saccomanno et al. | |
| 6,946,978 B2 | 9/2005 | Schofield | |
| 6,958,495 B2 | 10/2005 | Nishijima et al. | |
| 6,968,273 B2 | 11/2005 | Ockerse | |
| 7,012,543 B2 | 3/2006 | DeLine et al. | |
| 7,038,577 B2 | 5/2006 | Pawlicki et al. | |
| 7,042,616 B2 | 5/2006 | Tonar et al. | |
| 7,046,448 B2 | 5/2006 | Burgner | |
| 7,064,882 B2 | 6/2006 | Tonar | |
| 7,175,291 B1 | 2/2007 | Li | |
| 7,255,465 B2 | 8/2007 | DeLine et al. | |
| 7,262,406 B2 | 8/2007 | Heslin et al. | |
| 7,265,342 B2 | 9/2007 | Heslin et al. | |
| D553,061 S | 10/2007 | Schmidt et al. | |
| 7,285,903 B2 | 10/2007 | Cull et al. | |
| 7,287,868 B2 | 10/2007 | Carter | |
| 7,292,208 B1 | 11/2007 | Park et al. | |
| 7,311,428 B2 | 12/2007 | DeLine et al. | |
| 7,321,112 B2 | 1/2008 | Stam et al. | |
| 7,324,261 B2 | 1/2008 | Tonar et al. | |
| 7,338,190 B2 | 3/2008 | Blank | |
| 7,342,707 B2 | 3/2008 | Roberts | |
| 7,349,143 B2 | 3/2008 | Tonar et al. | |
| 7,360,932 B2 | 4/2008 | Uken et al. | |
| 7,417,221 B2 | 8/2008 | Creswick et al. | |
| 7,417,717 B2 | 8/2008 | Pack | |
| 7,446,650 B2 | 11/2008 | Scholfield et al. | |
| 7,452,113 B2 * | 11/2008 | Newton | B60Q 1/2665 362/494 |
| 7,467,883 B2 | 12/2008 | DeLine et al. | |
| 7,468,651 B2 | 12/2008 | DeLine et al. | |
| 7,505,047 B2 | 3/2009 | Yoshimura | |
| 7,533,998 B2 | 5/2009 | Schofield et al. | |
| 7,548,291 B2 | 6/2009 | Lee et al. | |
| 7,565,006 B2 | 7/2009 | Stam et al. | |
| 7,567,291 B2 | 7/2009 | Bechtel et al. | |
| 7,579,940 B2 | 8/2009 | Schofield et al. | |
| 7,592,563 B2 | 9/2009 | Wissenbach | |
| 7,619,508 B2 | 11/2009 | Lynam et al. | |
| 7,626,749 B2 | 12/2009 | Baur et al. | |
| 7,653,215 B2 | 1/2010 | Stam | |
| 7,658,521 B2 | 2/2010 | DeLine et al. | |
| 7,663,798 B2 | 2/2010 | Tonar | |
| 7,683,326 B2 | 3/2010 | Stam et al. | |
| 7,688,495 B2 | 3/2010 | Tonar et al. | |
| 7,706,046 B2 | 4/2010 | Bauer et al. | |
| 7,711,479 B2 | 5/2010 | Taylor et al. | |
| 7,719,408 B2 | 5/2010 | DeWard et al. | |
| 7,720,580 B2 | 5/2010 | Higgins-Luthman | |
| 7,746,534 B2 | 6/2010 | Tonar et al. | |
| 7,815,326 B2 | 10/2010 | Blank et al. | |
| 7,817,020 B2 | 10/2010 | Turnbull et al. | |
| 7,821,696 B2 | 10/2010 | Tonar et al. | |
| 7,830,583 B2 | 11/2010 | Neuman et al. | |
| 7,864,399 B2 | 1/2011 | McCabe et al. | |
| 7,877,175 B2 | 1/2011 | Higgins-Luthman | |
| 7,881,496 B2 | 2/2011 | Camilleri et al. | |
| 7,881,839 B2 | 2/2011 | Stam et al. | |
| 7,888,629 B2 | 2/2011 | Heslin et al. | |
| 7,914,188 B2 * | 3/2011 | DeLine | B60Q 1/2665 340/815.4 |
| 7,972,045 B2 | 7/2011 | Schofield | |
| 7,978,393 B2 | 7/2011 | Tonar et al. | |
| 7,994,471 B2 | 8/2011 | Heslin et al. | |
| 8,031,225 B2 | 10/2011 | Watanabe et al. | |
| 8,035,881 B2 | 10/2011 | Luten et al. | |
| 8,045,760 B2 | 10/2011 | Stam et al. | |
| 8,059,235 B2 | 11/2011 | Utsumi et al. | |
| 8,063,753 B2 * | 11/2011 | DeLine | B60K 35/00 340/425.5 |
| 8,090,153 B2 | 1/2012 | Schofield et al. | |
| 8,095,310 B2 | 1/2012 | Taylor et al. | |
| 8,100,568 B2 * | 1/2012 | DeLine | B60Q 1/2665 340/815.4 |
| 8,116,929 B2 | 2/2012 | Higgins-Luthman | |
| 8,120,652 B2 | 2/2012 | Bechtel et al. | |
| 8,142,059 B2 | 3/2012 | Higgins-Luthman et al. | |
| 8,162,518 B2 | 4/2012 | Schofield | |
| 8,194,133 B2 | 6/2012 | DeWind et al. | |
| 8,201,800 B2 | 6/2012 | Filipiak | |
| 8,203,433 B2 | 6/2012 | Deuber et al. | |
| 8,217,830 B2 | 7/2012 | Lynam | |
| 8,222,588 B2 | 7/2012 | Schofield et al. | |
| 8,237,909 B2 | 8/2012 | Ostreko et al. | |
| 8,258,433 B2 | 9/2012 | Byers et al. | |
| 8,267,559 B2 * | 9/2012 | DeLine | B60Q 1/2665 340/815.4 |
| 8,282,226 B2 | 10/2012 | Blank et al. | |
| 8,325,028 B2 | 12/2012 | Schofield et al. | |
| 8,482,683 B2 | 7/2013 | Hwang et al. | |
| 8,520,069 B2 | 8/2013 | Haler | |
| 8,534,887 B2 * | 9/2013 | DeLine | B60Q 1/2665 340/815.4 |
| 8,559,092 B2 | 10/2013 | Bugno et al. | |
| 8,564,662 B2 | 10/2013 | Busch et al. | |
| 8,779,910 B2 * | 7/2014 | DeLine | B60K 35/00 340/425.5 |
| 8,926,151 B2 * | 1/2015 | DeLine | B60Q 1/2665 340/815.4 |
| D729,714 S | 5/2015 | Roth | |
| 9,134,585 B2 | 9/2015 | Tonar et al. | |
| D746,744 S | 1/2016 | Sloterbeek et al. | |
| 9,319,639 B1 | 4/2016 | Englander et al. | |
| D755,097 S | 5/2016 | Lin | |
| 2001/0019356 A1 | 9/2001 | Takeda et al. | |
| 2001/0022616 A1 | 9/2001 | Rademacher et al. | |
| 2001/0026316 A1 | 10/2001 | Senatore | |
| 2001/0045981 A1 | 11/2001 | Gloger et al. | |
| 2002/0040962 A1 | 4/2002 | Schofield et al. | |
| 2002/0044065 A1 | 4/2002 | Quist et al. | |
| 2002/0191127 A1 | 12/2002 | Roberts et al. | |
| 2003/0002165 A1 | 1/2003 | Mathias et al. | |
| 2003/0007261 A1 | 1/2003 | Hutzel et al. | |
| 2003/0016125 A1 | 1/2003 | Lang et al. | |
| 2003/0016287 A1 | 1/2003 | Nakayama et al. | |
| 2003/0025596 A1 | 2/2003 | Lang et al. | |
| 2003/0025597 A1 | 2/2003 | Schofield | |
| 2003/0030546 A1 | 2/2003 | Tseng | |
| 2003/0030551 A1 | 2/2003 | Ho | |
| 2003/0030724 A1 | 2/2003 | Okamoto | |
| 2003/0035050 A1 | 2/2003 | Mizusawa | |
| 2003/0043269 A1 | 3/2003 | Park | |
| 2003/0052969 A1 | 3/2003 | Satoh et al. | |
| 2003/0058338 A1 | 3/2003 | Kawauchi et al. | |
| 2003/0067383 A1 | 4/2003 | Yang | |
| 2003/0076415 A1 | 4/2003 | Strumolo | |
| 2003/0080877 A1 | 5/2003 | Takagi et al. | |
| 2003/0085806 A1 | 5/2003 | Samman et al. | |
| 2003/0088361 A1 | 5/2003 | Sekiguchi | |
| 2003/0090568 A1 | 5/2003 | Pico | |
| 2003/0090569 A1 | 5/2003 | Poechmueller | |
| 2003/0090570 A1 | 5/2003 | Takagi et al. | |
| 2003/0098908 A1 | 5/2003 | Misaiji et al. | |
| 2003/0103141 A1 | 6/2003 | Bechtel et al. | |
| 2003/0103142 A1 | 6/2003 | Hitomi et al. | |
| 2003/0117522 A1 | 6/2003 | Okada | |
| 2003/0122929 A1 | 7/2003 | Minaudo et al. | |
| 2003/0122930 A1 | 7/2003 | Schofield et al. | |
| 2003/0133014 A1 | 7/2003 | Mendoza | |
| 2003/0137586 A1 | 7/2003 | Lewellen | |
| 2003/0141965 A1 | 7/2003 | Gunderson et al. | |
| 2003/0146831 A1 | 8/2003 | Berberich et al. | |

(56) References Cited

U.S. PATENT DOCUMENTS

| | | |
|---|---|---|
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0099693 A1 | 5/2005 | Schofield et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0158899 A1 | 7/2006 | Ayabe et al. |
| 2007/0146481 A1 | 6/2007 | Chen et al. |
| 2007/0171037 A1 | 7/2007 | Schofield et al. |
| 2008/0068520 A1 | 3/2008 | Minikey, Jr. et al. |
| 2008/0192132 A1 | 8/2008 | Bechtel et al. |
| 2008/0247192 A1 | 10/2008 | Hoshi et al. |
| 2008/0294315 A1 | 11/2008 | Breed |
| 2008/0302657 A1 | 12/2008 | Luten et al. |
| 2009/0015736 A1 | 1/2009 | Weller et al. |
| 2009/0141516 A1 | 6/2009 | Wu et al. |
| 2009/0296190 A1 | 12/2009 | Anderson et al. |
| 2010/0110553 A1 | 5/2010 | Anderson et al. |
| 2010/0201896 A1 | 8/2010 | Ostreko et al. |
| 2010/0277786 A1 | 11/2010 | Anderson et al. |
| 2010/0289995 A1 | 11/2010 | Hwang et al. |
| 2010/0328463 A1 | 12/2010 | Haler |
| 2011/0168687 A1 | 7/2011 | Door |
| 2011/0176323 A1 | 7/2011 | Skiver et al. |
| 2011/0181727 A1 | 7/2011 | Weller et al. |
| 2011/0317015 A1 | 12/2011 | Seto et al. |
| 2012/0038964 A1 | 2/2012 | De Wind et al. |
| 2012/0069444 A1 | 3/2012 | Campbell et al. |
| 2012/0182242 A1 | 7/2012 | Lindahl et al. |
| 2012/0229882 A1 | 9/2012 | Fish, Jr. et al. |
| 2012/0236388 A1 | 9/2012 | De Wind et al. |
| 2013/0028473 A1 | 1/2013 | Hilldore et al. |
| 2013/0170013 A1 | 7/2013 | Tonar et al. |
| 2013/0279014 A1 | 10/2013 | Fish, Jr. et al. |
| 2014/0022390 A1 | 1/2014 | Blank et al. |
| 2014/0043479 A1 | 2/2014 | Busch et al. |
| 2014/0192431 A1 | 7/2014 | Sloterbeek et al. |
| 2014/0347488 A1 | 11/2014 | Tazaki et al. |

FOREIGN PATENT DOCUMENTS

| | | |
|---|---|---|
| EP | 434453 B1 | 4/1997 |
| EP | 0899157 A1 | 3/1999 |
| EP | 0899157 B1 | 10/2004 |
| EP | 2393691 B1 | 5/2014 |
| EP | 2845921 A2 | 3/2015 |
| GB | 2338363 | 12/1999 |
| JP | 1178693 | 3/1999 |
| JP | 3070845 U | 8/2000 |
| JP | 2002096685 A | 4/2002 |
| JP | 2002120649 A | 4/2002 |
| JP | 2002200936 A | 7/2002 |
| JP | 2005148119 | 6/2005 |
| JP | 2005327600 | 11/2005 |
| JP | 2008139819 A | 6/2008 |
| JP | 2009542505 A | 12/2009 |
| JP | 2013244753 A | 12/2013 |
| KR | 20100123433 A | 11/2010 |
| WO | 9621581 | 7/1996 |
| WO | 2007006104 A1 | 1/2007 |
| WO | 2007103573 A2 | 9/2007 |
| WO | 2010090964 | 8/2010 |
| WO | 2011044312 A1 | 4/2011 |
| WO | 2013162985 A1 | 10/2013 |

OTHER PUBLICATIONS

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

(56) References Cited

OTHER PUBLICATIONS

Stone, "Automotive Display Specification," Proceedings of the Vehicle Display Symposium, 1995, pp. 93-96, Society for Information Display, Detroit Center, Santa Ana, CA.
International Searching Authority, International Search Report and Written Opinion for International Application No. PCT/US2016/028267 dated Sep. 8, 2016 (8 Pages).
Federal Institute of Industrial Property, "International Search Report and the Written Opinion of the International Searching Authority," dated Mar. 16, 2017 (9 pages).
Australian Government/IP Australia, "Examination report No. 1 for standard patent application," dated Mar. 3, 2017.
Federal Institute of Industrial Property, "International Search Report and the Written Opinion of the International Searching Authority," dated Mar. 6, 2017 (9 pages).
International Searching Authority, International Search Report and Written Opinion for International Application No. PCT/US2013/037080, dated Aug. 29, 2013, 6 pages.
Japanese Patent Office, Official Action for Japanese Application No. 2015-509030, dated Jan. 18, 2016, 15 pages.
State Intellectual Property Office of the People's Republic of China, Notification of the First Office Action for Chinese Application No. 201380028888.3, dated Apr. 6, 2016, 15 pages.

\* cited by examiner

US 9,994,156 B2

REARVIEW DEVICE

CROSS-REFERENCE TO RELATED APPLICATION

This application claims priority to and the benefit under 35 U.S.C. § 119(e) of U.S. Provisional Patent Application No. 62/248,953, filed on Oct. 30, 2015, entitled "REARVIEW DEVICE," the entire disclosure of which is hereby incorporated herein by reference.

BACKGROUND OF THE DISCLOSURE

The present disclosure generally relates to a rearview device, and more particularly, to an electro-optic element for a rearview device.

SUMMARY OF THE DISCLOSURE

One aspect of the disclosure includes a rearview device having a housing that includes a first side and a second side opposite the first side. An electro-optic element is operably coupled with the first side of the housing. A rear trim bezel is disposed on the second side of the housing. A rear trim plate is operably coupled with the second side of the housing. A peripheral gap is defined between the rear trim plate and the second side of the housing. A spacing truss is disposed in the peripheral gap. The spacing truss includes first and second lateral walls extending to the rear trim bezel.

Another aspect of the disclosure includes a rearview device having a housing that includes a front side and a rear side opposite the front side. An electro-optic element is operably coupled with the housing and is engaged with the front side. A trim bezel is disposed on the rear side of the housing behind the electro-optic element. A rear trim plate is operably coupled with the rear side of the housing. A peripheral gap is defined between the rear trim plate and the rear side of the housing.

Still another aspect of the disclosure includes a rearview device having a housing that includes a first side and a second side opposite the first side. An electro-optic element is operably coupled with the housing and is engaged with the first side. A printed circuit board is disposed inside the housing and includes a forward side and a rearward side. The printed circuit board includes a light pipe that conveys light directed at the electro-optic element to the rearward side of the printed circuit board.

These and other features, advantages, and objects of the present disclosure will be further understood and appreciated by those skilled in the art by reference to the following specification, claims, and appended drawings.

DETAILED DESCRIPTION

Figure 1:
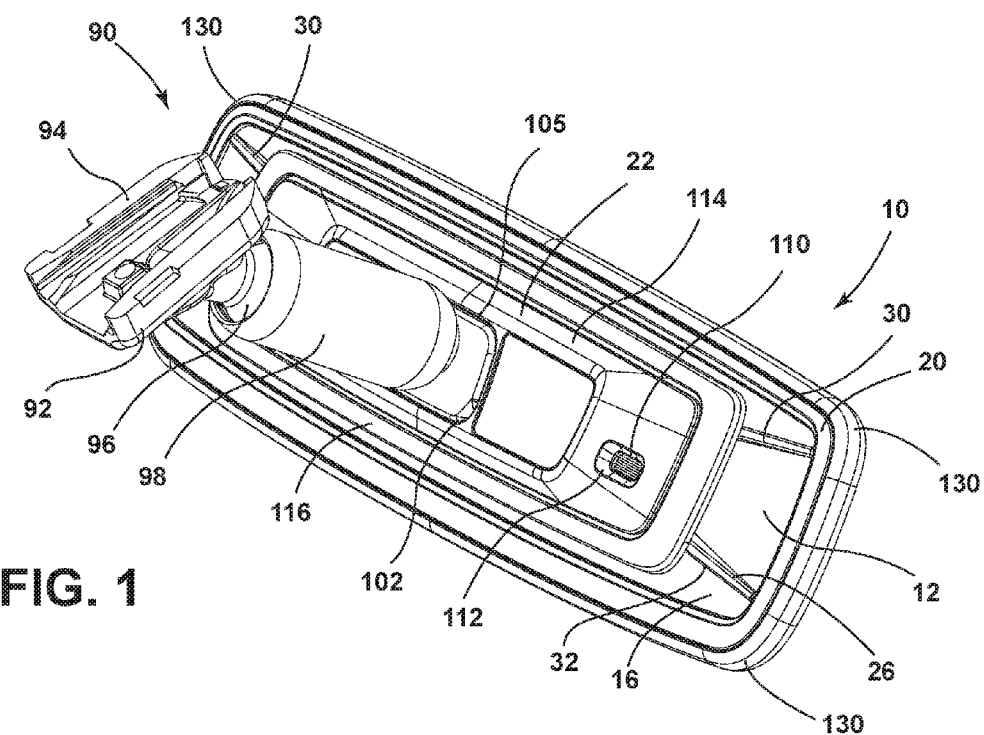
FIG. 1 is a top rear perspective view of one embodiment of a rearview device of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIGS. 1-8, reference numeral 10 generally designates a rearview device having a housing 12 that includes a first side 14 and a second side 16 opposite the first side 14. An electro-optic element 18 is operably coupled with the first side 14 of the housing 12. A rear trim bezel 20 is disposed on the second side 16 of the housing 12. A rear trim plate 22 is operably coupled with the second side 16 of the housing 12. A peripheral gap 24 is defined between the rear trim plate 22 and the second side 16 of the housing 12. A spacing truss 26 is disposed in the peripheral gap 24. The spacing truss 26 includes first and second lateral walls 30, 32 extending to the rear trim bezel 20.

Figure 2:
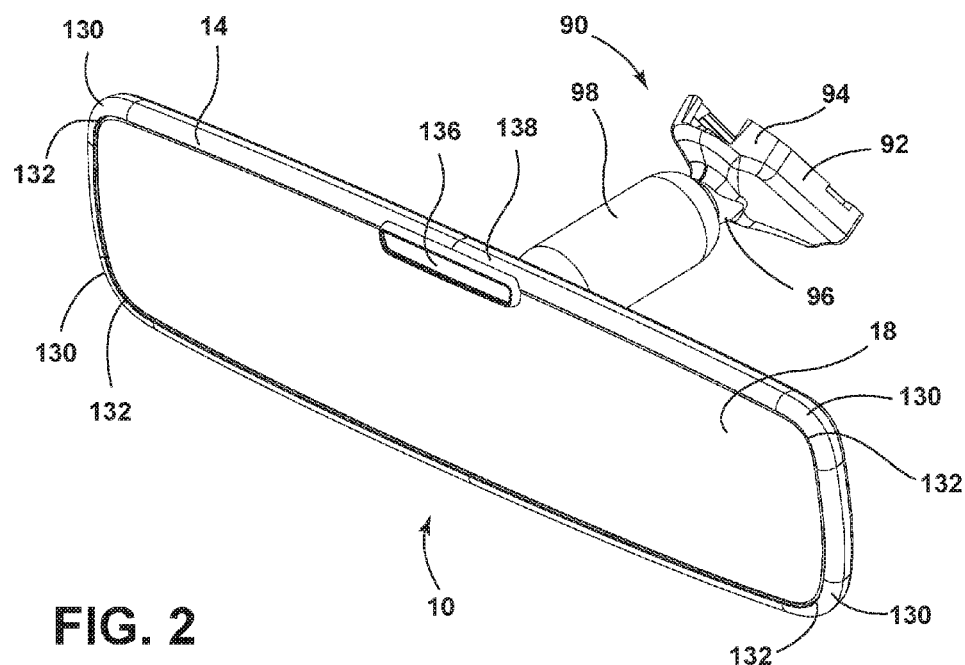
FIG. 2 is a front top perspective view of the rearview device of FIG. 1.
Figure 8:
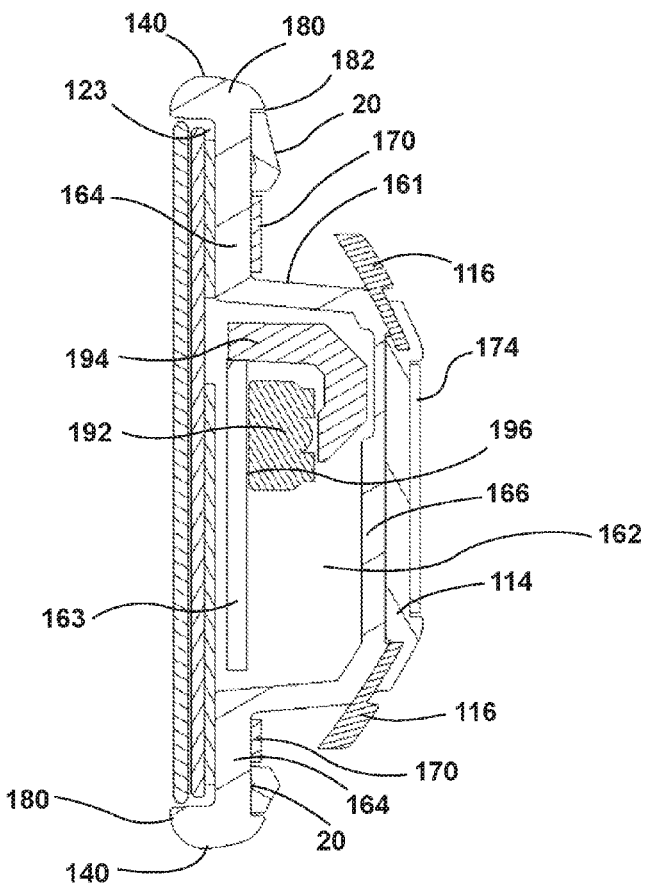
FIG. 8 is a side elevational cross-sectional view of one embodiment of a rearview device of the present disclosure.

Referring now to the embodiment depicted in FIGS. 1, 2, and 8, the rearview device 10 includes the electro-optic element 18. A first substantially transparent substrate 40 includes first and second surfaces 42, 44 (FIG. 9) disposed on opposite sides thereof. The second surface 44 includes a first electrically conductive layer 48. A second substantially transparent substrate 50 includes third and fourth surfaces 52, 54 disposed on opposite sides thereof. The third surface 52 includes a second electrically conductive layer 56. An electro-optic medium 60 is disposed in a cavity 62 between the first substantially transparent substrate 40 and the second substantially transparent substrate 50. The electro-optic medium 60 is variably transmissive such that the electro-optic medium 60 is operable between generally clear and darkened states. A display device may be disposed proximate the electro-optic element 18.

Referring again to FIGS. 1-3, the rearview device 10 generally includes a mounting assembly 90 having a mount 92 configured to engage a windshield button. The windshield button may be generally secured via an adhesive or other method of connection to a windshield of a vehicle. The mount 92 includes a base 94 and a mount ball 96 that projects from the base 94 and is received by a mount barrel 98. The mount barrel 98 engages the mount ball 96 of the mount 92, as well as a device ball 100 (FIG. 4) that is operably coupled with a rear portion 102 of the rearview device 10. The device ball 100 includes an engagement portion 104 configured to be secured with a mounting area 105 of the rear trim plate 22 of the rearview device 10 includes a receiving member (socket). It will also be understood that the mounting assembly 90 may be a single ball mount in which the rear portion 102 of the rearview device 10 directly engages the mount ball 96 of the mount 92.

With reference again to FIGS. 1, 2, 4, and 6, the rearview device 10 includes an ambient light sensor 110 that receives light through an aperture 112 that extends through the rear trim plate 22. The rear trim plate 22 includes an intermediate portion 114 and a peripheral flange 116. The peripheral flange 116 extends around the intermediate portion 114. The intermediate portion 114 also includes aesthetic portions 118 that are generally disposed on first and second sides 120, 122 of the device ball 100. In FIGS. 1 and 2, the housing 12 extends from the rear portion 102 of the rearview device 10 to a forward portion 121 (FIG. 5) of the rearview device 10, and includes a front recess 123 (FIGS. 8 and 9) configured to receive the electro-optic element 18. It will generally be understood that the electro-optic element 18 could be replaced with a prism-type element or other display-type element suitable for use in providing a rear view to an occupant in a vehicle. Because the housing 12 extends around and receives the electro-optic element 18, the rearview device 10 is free of a separate peripheral bezel. However, as previously noted, the rearview device 10 does include a rear trim bezel 20 that is visible from a rear side of the housing 12. Notably, the rear trim bezel 20 is not generally visible from a front of the housing 12 along a line of sight perpendicular to the planar extent of the electro-optic element 18.

The housing 12 generally includes a plurality of rounded corners 130 that may be generally complementary in shape to rounded corners 132 of the electro-optic element 18. In addition, a badge 136 is positioned over a top forward edge 138 of the housing 12 and the first surface 42 of the electro-optic element 18. It is generally contemplated that the badge 136 will be configured to display a purchaser's trademark, logo, etc.

Figure 3:
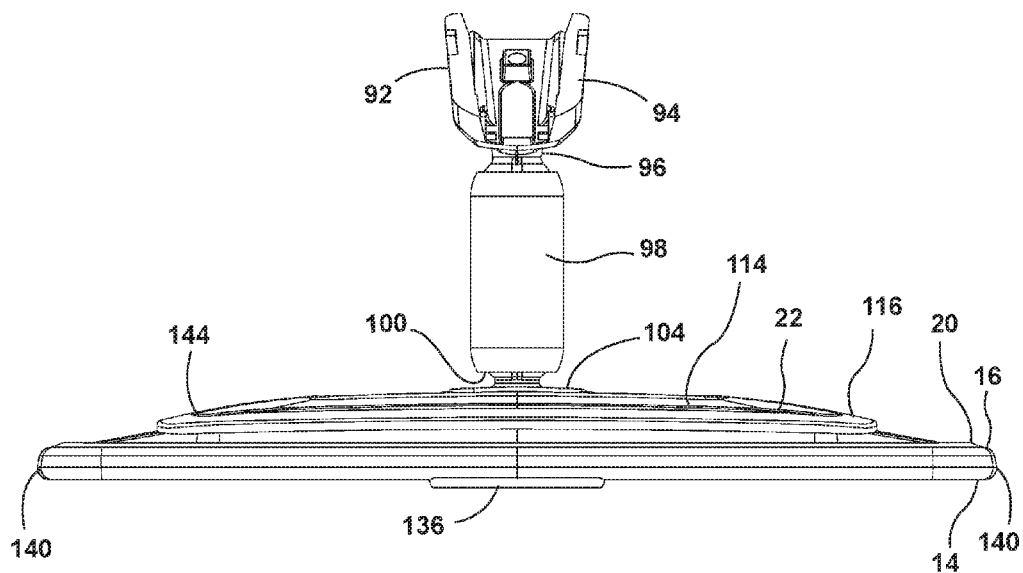
FIG. 3 is a side elevational view of the rearview device of FIG. 1.
Figure 4:
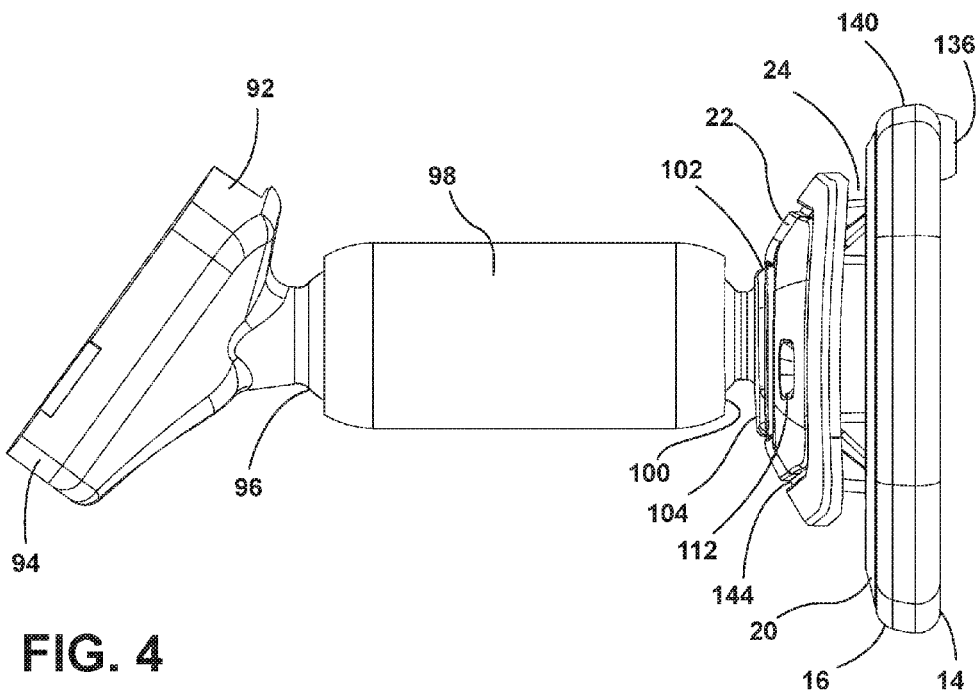
FIG. 4 is a top plan view of the rearview device of FIG. 1.

Turning now to FIGS. 3 and 4, the juxtaposition of the rear trim bezel 20 is readily discernible. In addition, the peripheral gap 24 (FIG. 9) that is defined between the rear trim plate 22 and the second or rear side 16 of the housing 12 can be seen. As illustrated, the peripheral flange 116 of the rear trim plate 22 is angled in a direction toward a peripheral edge 140 of the housing 12. Thus, the peripheral flange 116 of the rear trim plate 22 is not coplanar with the planar extent of the intermediate portion 114 of the rear trim plate 22. It is also contemplated that the rear trim plate 22 may include a curvilinear architecture. Regardless, it is generally contemplated that the peripheral flange 116 will extend toward and be angled toward the peripheral edge 140 of the housing 12. Nevertheless, it is also contemplated that the peripheral flange 116 could also extend linearly generally parallel with the planar extent of the electro-optic element 18.

Figure 5:
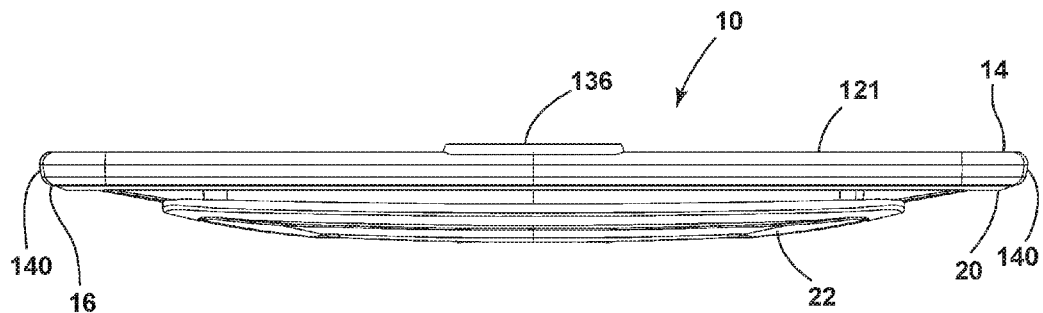
FIG. 5 is a top plan view of the rearview device of FIG. 1 with the mounting assembly removed.
Figure 6:
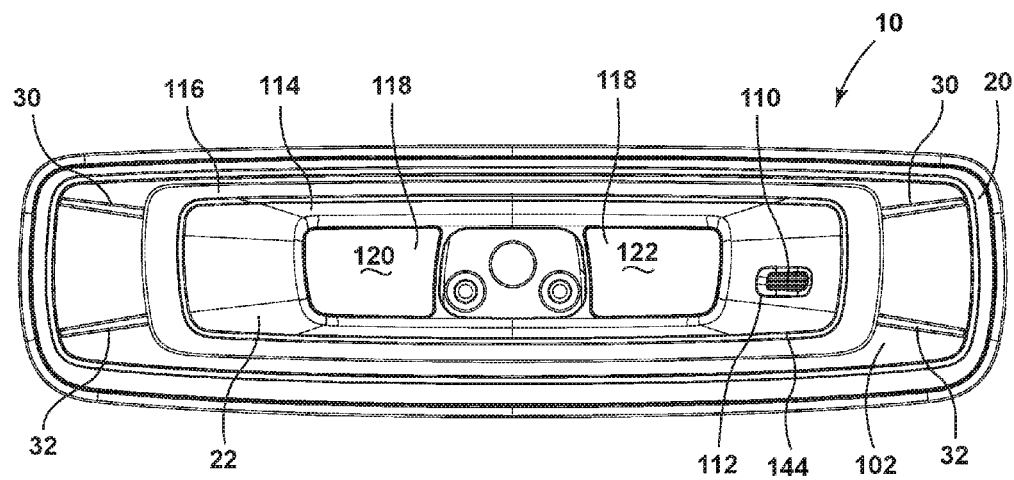
FIG. 6 is a rear elevational view of the rearview device of FIG. 1 with the mounting assembly removed.
Figure 7:
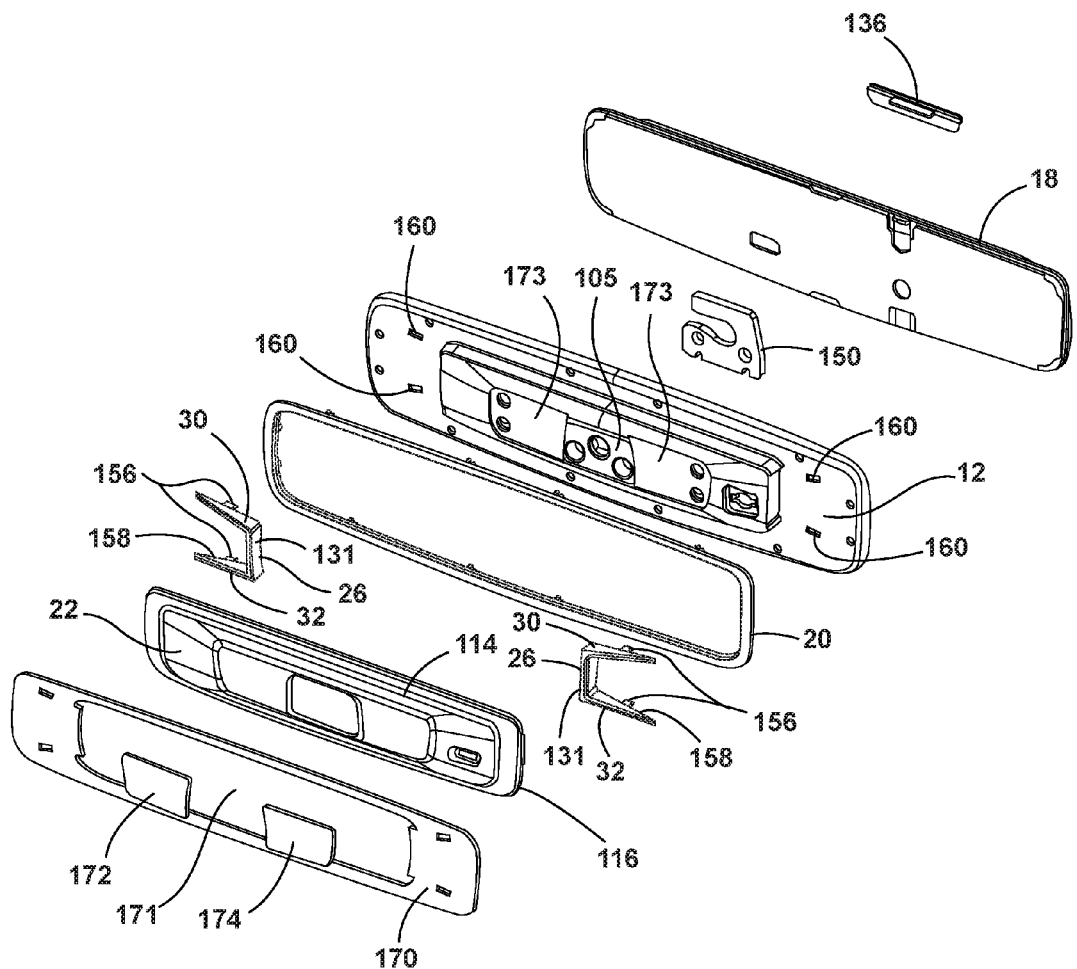
FIG. 7 is a top rear perspective exploded view of one embodiment of a rearview device of the present disclosure.

With reference to FIGS. 5-7, the rear portion 102 of the rearview device 10 includes a generally curved design. An aesthetic channel 144 is disposed between the intermediate portion 114 and the peripheral flange 116 of the rear trim plate 22. In the illustrated embodiment, first and second spacing trusses 26 are located on each side of the rearview device 10. The first and second spacing trusses 26 are shown extending in a direction toward the plurality of rounded corners 130 of the housing 12. Each of the first and second spacing trusses 26 includes a base wall 131 from which the first and second lateral walls 30, 32 extend toward the rear trim bezel 20. In the illustrated embodiment, the first and second lateral walls 30, 32 of the spacing truss 26 terminate at the rear trim bezel 20. However, it is generally contemplated that the first and second lateral walls 30, 32 may extend past the rear trim bezel 20, or may terminate before reaching the rear trim bezel 20. In addition, the first and second lateral walls 30, 32 are set at angles relative to the linear extent of the rearview device 10. Stated differently, the first and second lateral walls 30, 32 are not parallel. Rather, the first and second lateral walls 30, 32 extend at an angle relative to one another, generally in the direction of the plurality of rounded corners 130 of the housing 12.

With reference now to FIGS. 3 and 7-9, the components of the rearview device 10 as set forth in FIGS. 5 and 6 are illustrated in an exploded view. The housing 12 is configured to receive a washer 150 that supports and receives fasteners that secure the device ball 100 to the rear side or second side 16 of the housing 12. The electro-optic element 18 is received in the front recess 123 (FIG. 8) of the housing 12 and the badge 136 is secured to the first surface 42 (FIG. 9) of the electro-optic element 18. The badge 136 may be coupled with the housing 12 or the electro-optic element 18 via mechanical fasteners, adhesive, etc. In addition, the rear trim bezel 20 is generally illustrated, which is configured to engage the second side 16 of the housing 12. The rear trim bezel 20 extends around a periphery of the housing 12 on the second side 16 of the housing 12. However, the rear trim bezel 20 does not extend around the peripheral edge 140 of the housing 12. In addition, the spacing trusses 26 are operably coupled with the second side 16 of the housing 12, and include engagement flanges 156 protruding from an engagement side 158 of each of the first and second lateral walls 30, 32, which engage receiving slots 160 defined on the second side 16 of the housing 12. It is generally contemplated that the flanges 156 may engage via a snap-fit connection, for example.

With reference again to FIGS. 7 and 8, the rear trim plate 22 extends over a body 161 protruding from the housing 12. The body 161 generally defines a cavity 162 configured to house a printed circuit board 163. The body 161 includes a peripheral wall 164 that is generally parallel with a planar extent of the eletro-optic element 18. The peripheral wall 164 extends outwardly from the body 161. However, the rear trim plate 22 extends primarily over a rear face 166 of the body 161. A rear applique 170 is configured to engage a rear portion of the housing 12. The rear applique 170 defines an inner opening 171 within which the rear trim plate 22 and the mount 92 (FIG. 3) extend to couple with a rear portion of the housing 12. Thus, the rear applique 170 extends around the mount 92 and the rear trim plate 22. In addition, left-hand and right-hand appliques 172, 174, are configured to engage recesses 173 of the housing 12 disposed on left and right sides of the mounting area 105 (FIG. 1) of the device ball 100, respectively. As with the badge 136, which may include a variety of different emblems, logos, trademarks, etc., the appliques 170, 172, 174 are generally configured to be interchangeable to accommodate the needs of a particular purchaser. In addition, the appliques may be decorative appliques that match the interior or trim of a vehicle.

Figure 9:
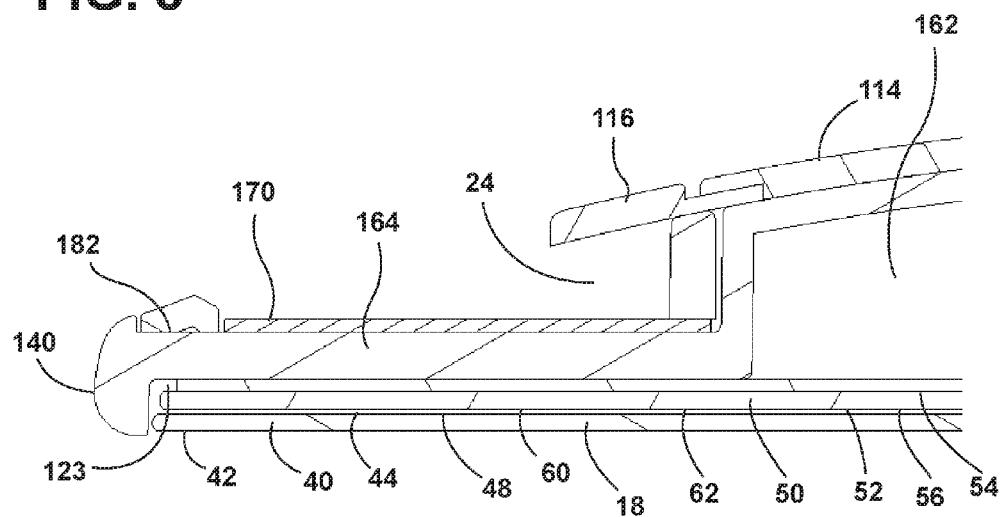
FIG. 9 is a partial top plan cross-sectional view of a portion of a rearview device of the present disclosure.

With reference now to FIGS. 8 and 9, the peripheral gap 24 defined between the rear trim plate 22 and the second side 16 or rear side of the housing 12 is illustrated. The rear applique 170 extends generally from the rear trim bezel 20 all the way to the body 161 of the housing 12. In addition, the rear applique 170 is larger on the sides than on the top and bottom. Further, it is generally understood that the peripheral wall 164 includes a bulbous rim 180 that extends about the periphery of the housing 12. The bulbous rim 180 is configured to conceal at least a portion of the periphery of the rear trim bezel 20, as well as the periphery of the electro-optic element 18. In the illustrated embodiment, the bulbous rim 180 generally abuts and conceals an outer wall 182 of the rear trim bezel 20. Further, the electro-optic element 18 is generally set in the front recess 123 such that the bulbous rim 180 protrudes slightly beyond the first surface 42 of the electro-optic element 18.

Turning again to FIG. 8, in the illustrated embodiment, it is noted that the intermediate portion 114 of the rear trim plate 22 is not coplanar with the peripheral flange 116. Further, the peripheral flange 116 may be constructed from a different material than the intermediate portion 114 and optionally include different reflective properties. In addition, the housing 12 supports the printed circuit board 163 illustrated as including a glare sensor 192 that receives light directed at the electro-optic element 18. The glare sensor 192 includes a light pipe 194 that conveys light directed at the electro-optic element 18 from the first surface 42 of the electro-optic element 18 to a rearward side 196 of the printed circuit board 163. Thus, a sleeker and slimmer profile from front to back can be obtained on the rearview device 10, as illustrated. In addition, the peripheral wall 164 includes a planar extent that is generally parallel with a planar extent of the electro-optic element 18. Accordingly, the printed circuit board 163 and other circuitry, as well as any other components that are made available for the rearview device 10, are all provided in the body 161 of the housing 12 and do not extend as far as the peripheral walls 164 of the rearview device 10. However, it is contemplated that in some embodiments, additional room may be gained between the electro-optic element 18 and the peripheral wall 164 of the housing 12.

The multi-piece construction, as set forth above, includes improved aesthetics that are configurable to provide multiple styling options. Various appliques can be changed to modify the appearance of the rearview device 10. In addition, the spacing trusses 26 are plated and can be removed to modify the appearance of the rearview device 10. Further, the rear trim bezel 20 can be modified to include different finishes, thus also modifying the appearance of the rearview device 10. The rear trim plate 22 gives the appearance of having a floating condition. In one example, the outer portion or peripheral flange 116 of the rear trim plate 22 is clear, while the intermediate portion 114 is opaque. In another example, the peripheral flange 116 is opaque, while the intermediate portion 114 is clear. Variations on this configuration can be made to provide various aesthetics, depending on the preference of the consumer. Moreover, the rear trim plate 22 provides an aperture, as set forth above, that allows for the ambient light sensor 110, which is located in the body 161 of the housing 12, to receive light, thus providing data to the printed circuit board 163 related to the ambient light condition when the vehicle, and specifically the rearview device 10, are being used.

The electro-optic element 18 could also be an element such as a prism. One non-limiting example of an electro-optic element includes an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety. The glass element may also be any other element having partially reflective, partially transmissive properties. To provide electric current to the glass element, electrical elements are provided on opposing sides of the element, to generate an electrical potential therebetween. Element clips, such as J-clips, are electrically engaged with each electrical element, and element wires extend from the J-clips to the main printed circuit board (PCB).

The present disclosure may be used with a rearview assembly such as that described in U.S. Pat. Nos. 8,925,891; 8,814,373; 8,201,800; and 8,210,695; U.S. Patent Application Publication Nos. 2014/0063630, now U.S. Pat. No. 9,174,577, and 2012/0327234, now U.S. Pat. No. 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the disclosure described herein may be comprised of one or more conventional processors and unique stored program instructions that control one or more processors to implement, in conjunction with certain non-processor circuits, some, most, or all of the functions of a display mirror assembly, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview device comprising:
a housing including a first side and a second side opposite the first side;
an electro-optic element operably coupled with the first side of the housing;
a rear trim bezel disposed on the second side of the housing;
a rear trim plate operably coupled with the second side of the housing;
a peripheral gap defined between the rear trim plate and the second side of the housing; and
a spacing truss disposed in the peripheral gap, the spacing truss including first and second lateral walls extending to the rear trim bezel.

2. The rearview device of claim 1, wherein the rear trim plate includes an intermediate portion and a peripheral flange.

3. The rearview device of claim 2, wherein the peripheral flange extends from the intermediate portion and is angled toward a peripheral edge of the housing.

4. The rearview device of claim 1, wherein the housing includes a body defining a cavity configured to house a printed circuit board, wherein the body includes a peripheral wall that is generally co-planar with a planar extent of the electro-optic element.

5. The rearview device of claim 4, wherein the peripheral wall includes a bulbous rim.

6. The rearview device of claim 4, wherein the printed circuit board includes a glare sensor that receives light directed at the electro-optic element.

7. The rearview device of claim 6, wherein the glare sensor includes a light pipe that conveys light directed at the electro-optic element to the rearward side of the printed circuit board.

8. The rearview device of claim 1, wherein the rear trim bezel is visible only when viewing the second side of the housing.

9. A rearview device comprising:
   a housing including a front side and a rear side opposite the front side;
   an electro-optic element operably coupled with the housing and engaged with the front side;
   a trim bezel disposed on the rear side of the housing, behind the electro-optic element;
   a rear trim plate operably coupled with the rear side of the housing; and
   a peripheral gap defined between the rear trim plate and the rear side of the housing.

10. The rearview device of claim 9, further comprising:
    a decorative applique disposed on the rear side of the housing, the decorative applique extending around the rear trim plate.

11. The rearview device of claim 10, wherein the housing includes a body defining a cavity configured to house a printed circuit board, wherein the body includes a peripheral wall that is generally coplanar with a planar extent of the electro-optic element.

12. The rearview device of claim 11, wherein the peripheral wall includes a bulbous rim.

13. The rearview device of claim 11, wherein the printed circuit board includes a forward side and a rearward side, the printed circuit board including a glare sensor light pipe that conveys light directed at the electro-optic element to the rearward side of the printed circuit board.

14. The rearview device of claim 9, further comprising:
    first and second trusses disposed on the rear side of the housing, the first and second trusses including a base wall and a plurality of outwardly extending lateral walls.

15. The rearview device of claim 14, wherein the plurality of outwardly extending lateral walls extend to the trim bezel.

16. A rearview device comprising:
    a housing including a first side and a second side opposite the first side;
    an electro-optic element operably coupled with the housing and engaged with the first side; and
    a printed circuit board disposed inside the housing and including a forward side and a rearward side, the printed circuit board including a light pipe that conveys light directed at the electro-optic element to the rearward side of the printed circuit board.

17. The rearview device of claim 16, wherein the housing includes a body defining a cavity configured to house the printed circuit board, wherein the body includes a peripheral wall that is generally co-planar with a planar extent of the electro-optic element.

18. The rearview device of claim 17, further comprising:
    a rear trim bezel disposed on the second side of the housing;
    a rear trim plate operably coupled with the second side of the housing;
    a peripheral gap defined between the rear trim plate and the second side of the housing; and
    a spacing truss disposed in the peripheral gap, the spacing truss including first and second lateral walls extending to the rear trim bezel.

19. The rearview device of claim 16, wherein the printed circuit board includes a glare sensor that receives light directed at the electro-optic element.

20. The rearview device of claim 16, further comprising:
    a glare sensor on the rearward side of the printed circuit board that receives light from the light pipe.

* * * * *